US011751052B2

(12) United States Patent
Tian et al.

(10) Patent No.: US 11,751,052 B2
(45) Date of Patent: Sep. 5, 2023

(54) CREDENTIAL INFORMATION PROCESSING METHOD AND APPARATUS FOR NETWORK CONNECTION, AND APPLICATION (APP)

(71) Applicant: CHINA IWNCOMM CO., LTD., Shaanxi (CN)

(72) Inventors: Yucun Tian, Shaanxi (CN); Wei Zhang, Shaanxi (CN); Weigang Tong, Shaanxi (CN); Xiang Yan, Shaanxi (CN)

(73) Assignee: CHINA IWNCOMM CO., LTD., Shaanxi (CN)

( * ) Notice: Subject to any disclaimer, the term of this patent is extended or adjusted under 35 U.S.C. 154(b) by 542 days.

(21) Appl. No.: 16/482,475

(22) PCT Filed: Feb. 27, 2018

(86) PCT No.: PCT/CN2018/077364
§ 371 (c)(1),
(2) Date: Jul. 31, 2019

(87) PCT Pub. No.: WO2018/157782
PCT Pub. Date: Sep. 7, 2018

(65) Prior Publication Data
US 2020/0008062 A1     Jan. 2, 2020

(30) Foreign Application Priority Data

Mar. 1, 2017  (CN) .......................... 201710117743.0
Mar. 14, 2017  (CN) .......................... 201710150249.4

(51) Int. Cl.
*H04W 48/08*     (2009.01)
*H04W 12/069*    (2021.01)
(Continued)

(52) U.S. Cl.
CPC ....... *H04W 12/069* (2021.01); *H04W 12/068* (2021.01); *H04W 12/69* (2021.01); *H04W 48/08* (2013.01)

(58) Field of Classification Search
CPC ...................................................... H04W 48/08
(Continued)

(56) References Cited

U.S. PATENT DOCUMENTS 7,231,517 B1 *  6/2007  Mashayekhi ......... H04L 63/045
                                                     726/8
9,258,704 B2 *  2/2016  Zucker .................. H04W 12/04
(Continued)

FOREIGN PATENT DOCUMENTS

CN     102026197 A     4/2011
CN     103220669 A     7/2013
(Continued)

OTHER PUBLICATIONS

JPO Notice of Reasons for Refusal corresponding to JP Application No. 2019-560452, dated Sep. 14, 2020.
(Continued)

*Primary Examiner* — Thu Ha T Nguyen
(74) *Attorney, Agent, or Firm* — CANTOR COLBURN LLP

(57) ABSTRACT

Disclosed in the present invention are a credential information processing method and apparatus for network connection, and an application (APP). The method comprises: in response to an instruction for applying for a network credential for a second terminal, a first terminal sends a first credential downloading request to a server; the first terminal receives first credential information sent by the server; and the second terminal receives the first credential information sent directly by the first terminal from a system memory of the first terminal and a network identifier of a wireless
(Continued)

network to be connected, the second terminal stores the first credential information directly into a secure storage region of the second terminal from a system memory of the second terminal, and the second terminal connects a wireless network corresponding to the network identifier by using the first credential information in the secure storage region.

30 Claims, 6 Drawing Sheets

(51) Int. Cl.
  *H04W 12/06* (2021.01)
  *H04W 12/69* (2021.01)
(58) Field of Classification Search
  USPC .............................. 709/203, 227, 228; 726/2
  See application file for complete search history.

(56) References Cited

U.S. PATENT DOCUMENTS

| | | | | |
|---|---|---|---|---|
| 9,928,379 | B1* | 3/2018 | Hoffer | G16H 50/20 |
| 9,961,548 | B2* | 5/2018 | Bryksa | H04W 12/06 |
| 10,206,099 | B1* | 2/2019 | Trinh | H04W 4/021 |
| 10,237,252 | B2* | 3/2019 | Nandyala | H04L 63/08 |
| 10,764,752 | B1* | 9/2020 | Avetisov | H04L 63/062 |
| 2003/0050962 | A1* | 3/2003 | Monsen | G06F 21/6272 |
| | | | | 709/203 |
| 2004/0210756 | A1* | 10/2004 | Mowers | H04L 63/166 |
| | | | | 713/168 |
| 2006/0075001 | A1* | 4/2006 | Canning | G06F 8/65 |
| | | | | 707/999.203 |
| 2006/0294388 | A1* | 12/2006 | Abraham | H04L 63/08 |
| | | | | 713/182 |
| 2007/0208803 | A1* | 9/2007 | Levi | H04L 51/38 |
| | | | | 709/203 |
| 2010/0048161 | A1* | 2/2010 | He | H04W 4/90 |
| | | | | 370/328 |
| 2010/0251334 | A1* | 9/2010 | Xiao | H04W 12/08 |
| | | | | 726/3 |
| 2010/0263023 | A1* | 10/2010 | Xiao | H04L 41/0893 |
| | | | | 726/3 |
| 2010/0287235 | A1* | 11/2010 | Blakley, III | G06F 21/41 |
| | | | | 709/203 |
| 2011/0154454 | A1* | 6/2011 | Frelechoux | H04L 63/0892 |
| | | | | 726/5 |
| 2011/0161659 | A1 | 6/2011 | Himawan et al. | |
| 2011/0191579 | A1* | 8/2011 | Xiao | H04L 41/0893 |
| | | | | 713/155 |
| 2011/0197267 | A1* | 8/2011 | Gravel | H04W 12/068 |
| | | | | 726/5 |
| 2011/0296186 | A1* | 12/2011 | Wong | H04L 63/0428 |
| | | | | 713/171 |
| 2012/0005718 | A1* | 1/2012 | Xiao | H04L 41/0893 |
| | | | | 726/1 |
| 2013/0205380 | A1* | 8/2013 | Avni | H04L 63/08 |
| | | | | 726/7 |
| 2013/0254864 | A1 | 9/2013 | Koster et al. | |
| 2013/0268357 | A1* | 10/2013 | Heath | G06Q 10/10 |
| | | | | 726/26 |
| 2014/0007209 | A1 | 1/2014 | Zucker | |
| 2014/0165180 | A1* | 6/2014 | Sauther | H04W 12/069 |
| | | | | 726/10 |
| 2016/0261587 | A1 | 9/2016 | Koster et al. | |
| 2016/0344559 | A1* | 11/2016 | Ma | H04L 9/3263 |
| 2017/0012951 | A1* | 1/2017 | Mennes | H04L 63/10 |
| 2017/0142064 | A1* | 5/2017 | Weis | H04L 63/061 |
| 2017/0272455 | A1* | 9/2017 | Black | H04W 12/069 |
| 2017/0279795 | A1* | 9/2017 | Redberg | H04L 63/0861 |
| 2018/0048674 | A1* | 2/2018 | Black | H04W 12/03 |
| 2018/0091977 | A1* | 3/2018 | Lu | H04W 12/126 |
| 2018/0183778 | A1* | 6/2018 | Bettenburg | G06F 16/9554 |
| 2019/0014141 | A1* | 1/2019 | Segal | H04L 63/1483 |
| 2019/0149541 | A1* | 5/2019 | Valenti | G06Q 20/36 |
| | | | | 713/186 |
| 2019/0312903 | A1* | 10/2019 | Zini | H04L 61/103 |
| 2020/0067922 | A1* | 2/2020 | Avetisov | H04L 63/18 |
| 2021/0044976 | A1* | 2/2021 | Avetisov | H04L 9/3218 |
| 2021/0258308 | A1* | 8/2021 | Avetisov | H04L 9/3234 |
| 2021/0288981 | A1* | 9/2021 | Numainville | H04L 63/1441 |
| 2022/0405580 | A1* | 12/2022 | Zheng | G06F 18/24147 |
| 2023/0037852 | A1* | 2/2023 | Islam | H04W 72/23 |

FOREIGN PATENT DOCUMENTS

| | | |
|---|---|---|
| CN | 105636030 A | 6/2016 |
| CN | 105959971 A | 9/2016 |
| JP | 2015526025 A | 9/2015 |
| JP | 2016219955 A | 12/2016 |
| KR | 20150045424 A | 4/2015 |
| WO | 2004034671 A1 | 4/2004 |

OTHER PUBLICATIONS

EPO Extended European Search Report, for Corresponding EP Appln No. 18761355.9, dated Mar. 25, 2019.
EPO First Office Action corresponding to EP Appln No. 18761355.9 dated Apr. 7, 2020.
KIPO Notification of Reason for Refusal for corresponding KR 10-2019-7021587 dated Feb. 20, 2020.

* cited by examiner

CREDENTIAL INFORMATION PROCESSING METHOD AND APPARATUS FOR NETWORK CONNECTION, AND APPLICATION (APP)

CROSS-REFERENCE TO RELATED APPLICATIONS

This application is the national phase of International Application No. PCT/CN2018/077364, filed on Feb. 27, 2018, which claims the benefit of priority to Chinese Patent Application No. 201710150249.4, filed on Mar. 14, 2017 and Chinese Patent Application No. 201710117743.0, filed on Mar. 1, 2017, the entire contents of this application are hereby incorporated herein by reference.

TECHNICAL FIELD

The present disclosure relates to the technical field of communications, and in particular to a credential information processing method and apparatus for network connection, and an application (APP).

BACKGROUND

When the terminal is to access the wireless network, it is usually required to provide credential information for networking to the wireless network. The terminal is allowed to access only when the credential information is verified correctly. For example, for a wireless network adopting wireless fidelity (WIFI) technology and a terminal supporting WIFI technology, the terminal may request, by using the network name and the connection password of the wireless network, to connect to the wireless network having the network name. The terminal is allowed to access the wireless network after the inputted connection password is verified successfully.

However, when the terminal needs to connect to other wireless network, the wireless network provider needs to announce the credential information for connecting to the wireless network to the user of the terminal, and the user of the terminal needs to manually input the credential information on the terminal. For example, a user X provides a wireless network at home, that is, the user X is a wireless network provider. When a user Y comes to the home of the user X, and needs to connect the mobile phone of the user Y to the wireless network at home of the user X, the following operations are performed. First, the user X needs to tell the user Y the name and connection password of the wireless network, then the user Y opens "Settings" in the mobile phone, and selects and click the wireless network name of the user X from multiple wireless network names in "Settings". After the network connection interface appears, the user Y manually inputs the connection password for network connection. In a case that the connection password is complicated or lengthy, it is inconvenient to remember and cumbersome to enter for the user Y. It can be seen that, on one hand, the user feels inconvenient to connect the terminal to the wireless network. On the other hand, the credential information of the wireless network is published, which may result in a potential security risk.

SUMMARY

The technical problem to be solved by the present disclosure, is to provide a credential information processing method, apparatus and an application APP, so that a terminal can obtain credential information of a wireless network without manual inputting by a user and can connect to the network by using the credential information. In this way, user networking operations are simplified, so as to avoid publishing of the credential information for networking, and improve the security of the wireless network.

In a first aspect, according to an embodiment of the present disclosure, a credential information processing method for network connection is provided, which includes:

sending, by a first terminal, a first credential download request to a server in response to an instruction to apply a networking credential for a second terminal, where the first credential download request carries user identity information of the first terminal, and the user identity information is used by the server to perform user identity verification on the first terminal;

receiving, by the first terminal, first credential information sent by the server in a case that the user identity verification of the first terminal is successful;

receiving, by the second terminal, the first credential information and a network identifier of a wireless network to be connected directly sent by the first terminal from a system memory of the first terminal;

storing, by the second terminal, the received first credential information directly to a secure storage area of the second terminal from a system memory of the second terminal; and connecting, by the second terminal, to the wireless network having the network identifier by using the first credential information in the secure storage area.

In a second aspect, according to an embodiment of the present disclosure, a credential information processing apparatus for network connection is provided, which is applied in a first terminal and includes an application module.

The application module is configured to send a first credential download request to a server in response to an instruction to apply a networking credential for a second terminal, receive first credential information sent by the server in a case that user identity verification is successful, and send the first credential information and a network identifier of a wireless network to be connected directly from a system memory of the first terminal to the second terminal.

Alternatively, the application module is configured to send a second credential download request to a server in response to an instruction to apply a networking credential for the first terminal, and receive second credential information sent by the server in a case that user identity verification is successful.

The first credential download request or the second credential download request carries user identity information of the first terminal. The user identity information is used by the server to perform user identity verification on the first terminal; the first credential information is used by the second terminal to connect to the wireless network having the network identifier; and the second credential information is used by the first terminal to connect to the wireless network.

In a third aspect, according to an embodiment of the present disclosure, a credential information processing apparatus for network connection is provided, which is applied in a second terminal, and includes an application module, a storage module and a network connection module.

The application module is configured to receive first credential information and a network identifier of a wireless network to be connected sent by a first terminal. The first credential information is downloaded from a server and is sent to the second terminal by the first terminal in response to an instruction to apply a network credential for the second terminal.

The storage module is configured to store the first credential information directly to a secure storage area of the second terminal from a system memory of the second terminal.

The network connection module is configured to connect to the wireless network having the network identifier by using the first credential information in the secure storage area.

In a fourth aspect, according to an embodiment of the present disclosure, an application APP is further provided, which is applied in a first terminal. The application APP includes an application module.

The application module is configured to send a first credential download request to a server in response to an instruction to apply a networking credential for a second terminal, receive first credential information sent by the server in a case that user identity verification is successful, and send the first credential information and a network identifier of a wireless network to be connected directly from a system memory of the first terminal to the second terminal.

Alternatively, the application module is configured to send a second credential download request to a server in response to an instruction to apply a networking credential for the first terminal, and receive second credential information sent by the server in a case that the user identity verification is successful.

The first credential download request or the second credential download request carries user identity information of the first terminal. The user identity information is used by the server to perform user identity verification on the first terminal; the first credential information is used by the second terminal to connect to a wireless network having the network identifier; and the second credential information is used by the first terminal to connect to the wireless network.

In a fifth aspect, according to an embodiment of the present disclosure, an application APP is further provided, which is applied in a second terminal. The application APP includes an application module.

The application module is configured to receive first credential information and a network identifier of a wireless network to be connected sent by a first terminal, and the first credential information is downloaded from a server and sent to the second terminal by the first terminal in response to an instruction to apply a networking credential for the second terminal.

The application module is configured to call a storage module of the second terminal to store the first credential information directly to a secure storage area of the second terminal from a system memory of the second terminal.

The application module is further configured to call a network connection module of the second terminal to connect to the wireless network having the network identifier by using the first credential information stored in the secure storage area.

Compared with the conventional art, the present disclosure has the following advantages:

according to the technical solutions of the embodiments of the present disclosure, when a second terminal needs to connect to the wireless network by using the credential information, a first terminal having the certificate application authority of the wireless network can request the server to download the credential information for connecting to the wireless network, and send the credential information and the network identifier of the wireless network to the second terminal, so that the second terminal can obtain the credential information and the network identifier of the wireless network without manual inputting, and connect to the wireless network having the network identifier by using the credential information. It can be seen that in the process of connecting to the wireless network by the second terminal, it is unnecessary to manually input the credential information by the user, the networking operation is simplified, and the credential information is not required to be announced to the user who uses the second terminal to connect to the network, thereby avoiding publishing of the credential information for connecting to the wireless network, and improving the security of the wireless network.

BRIEF DESCRIPTION OF THE DRAWINGS

In order to more clearly illustrate technical solutions in the embodiments of the present disclosure or in the conventional art, the drawings to be used in the description of the embodiments or the conventional art are briefly described below. Apparently, the drawings in the following description only show a few embodiments described in the present application, and for those skilled in the art, other drawings can be obtained from these drawings without any creative work.

DETAILED DESCRIPTION OF THE EMBODIMENTS

Figure 1:
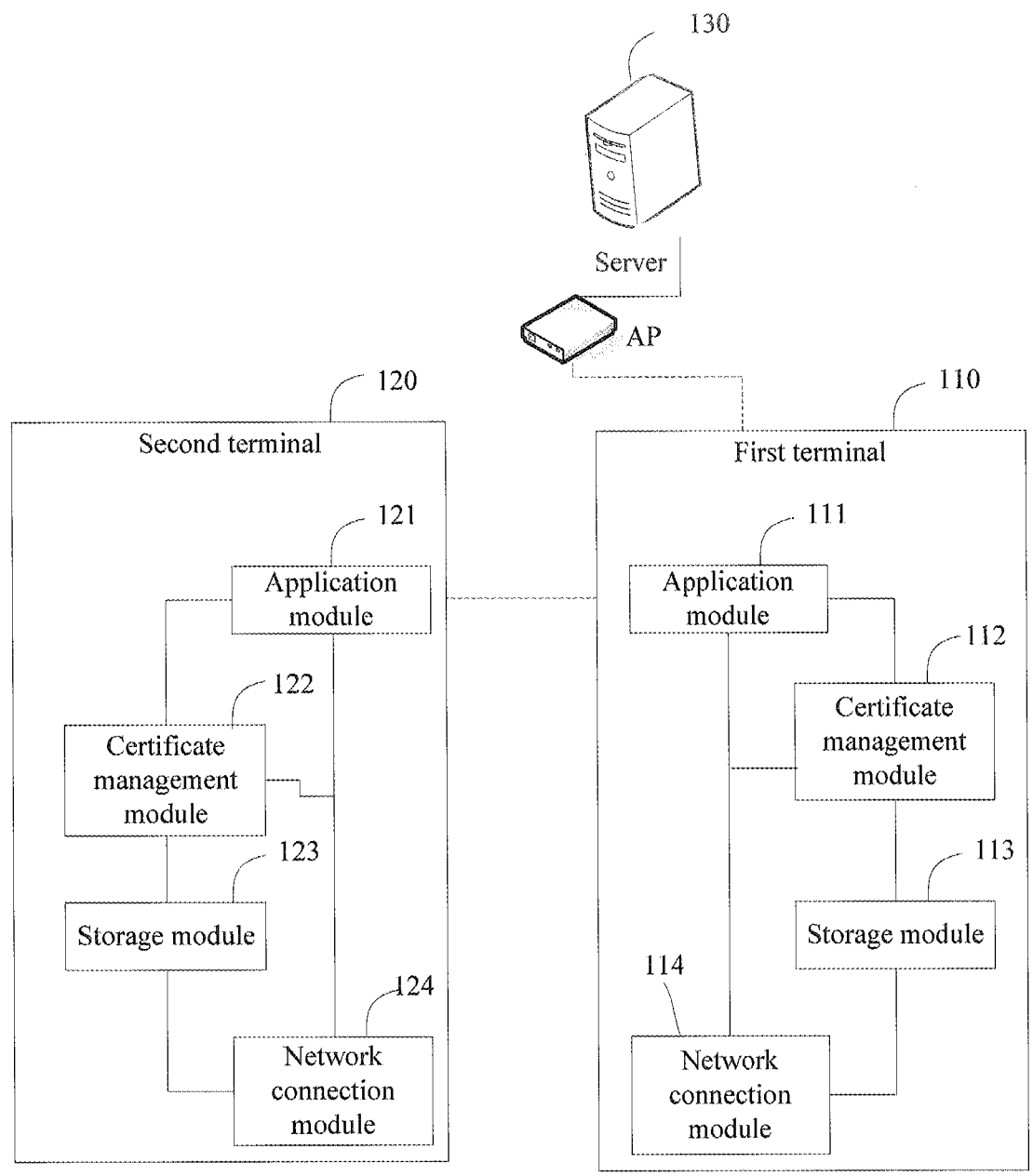
FIG. 1 is a schematic diagram of an exemplary application scenario according to an embodiment of the present disclosure.

In order to enable those skilled in the art to better understand the solution of the present disclosure, the technical solutions in the embodiments of the present disclosure are clearly and completely described in the following with reference to the accompanying drawings in the embodiments of the present disclosure. Apparently, the embodiments described are only a part of the embodiments of the present application, rather than all of the embodiments. Based on the embodiments in the present disclosure, all other embodiments obtained by those skilled in the art without creative work fall within the scope of the protection of the present disclosure.

It is found by the inventor that in order to enable a terminal to connect to a wireless network, a wireless network provider needs to inform a user of the terminal of credential information for connecting to the wireless network, and the terminal can be connected to the wireless network after the user of the terminal manually inputs or installs the credential information on the terminal. On one hand, the user needs to memorize the credential information (such as a password) for connecting to the wireless network, and manually input the credential information into a wireless network connection interface of the terminal, and thus the user operation is cumbersome. On the other hand, the wireless network provider needs to announce the credential information for networking to other users who use a terminal to connect to the wireless network, and the credential information is leaked with a great probability when being announced. In a case that the credential information is obtained by a malicious user, the malicious user may attack the wireless network. It can be seen that there is a potential risk in the security of the wireless network.

In the embodiments of the present disclosure, if the wireless network provider uses a first terminal, the first terminal has the certificate application authority of the wireless network. That is, user identity information provided by the first terminal can be successfully verified by a server, and thus the credential information for networking can be downloaded from the server. When other user needs to use a second terminal to connect to the wireless network, the wireless network provider requests the server to download the credential information for networking by using the first terminal, and sends a network identifier of the wireless network and the credential information for networking to the second terminal, so that the second terminal can obtain the network identifier of the wireless network and the credential information without manual inputting, and connect to the wireless network having the network identifier by using the credential information. It can be seen that in the process of connecting to the wireless network by the second terminal, it is unnecessary to manually input the credential information on the second terminal by the user, the networking operation is simplified, and the wireless network provider does not need to announce the credential information to the user using the second terminal to connect to the network, thereby avoiding the publishing of the credential information for networking, reducing a possibility that the malicious user obtains the credential information and attacks the wireless network due to the leakage of the credential information, and improving the security of the wireless network.

Reference is made to FIG. 1, which is a schematic diagram of an exemplary application scenario according to an embodiment of the present disclosure. A first terminal 110 may interact with a server 130 through a wireless access point AP (also referred to as a wireless router), and the first terminal 110 may interact with a second terminal 120. For example, the first terminal 110 may include an application module 111, a certificate management module 112, a storage module 113 and a network connection module 114. The second terminal 120 may for example include an application module 121, a certificate management module 122, a storage module 123 and a network connection module 124.

As an example, the first terminal 110 may include only an application module 111. The application module 111 may send a first certificate download request to the server in response to an instruction to apply a networking credential for other terminal (referring to a second terminal in the embodiment of the present disclosure). The instruction to apply the networking credential for other terminal may be generated by the first terminal 110, or may be generated by the second terminal 120 and sent to the first terminal 110 through the application module 121. The first credential download request carries the user identity information provided by the first terminal 110. The server 130 may perform user identity verification on the first terminal 110 based on the user identity information, and send first credential information to the first terminal 110 if the user identity verification of the first terminal 110 is successful. The first terminal 110 may receive the first credential information through the application module 111 and send the first credential information and a network identifier of a wireless network to be connected to the second terminal 120. The second terminal 120 may include only an application module 121, a storage module 123 and a network connection module 124. The second terminal 120 receives the first credential information and the network identifier through the application module 121, stores the first credential information in a secure storage area of the second terminal 120 by the storage module 123, and connects to the wireless network having the network identifier by using the first credential information stored in the secure storage area of the second terminal 120 through the network connection module 124. The network identifier may be manually inputted by the wireless network provider on a sending interface where the first terminal 110 sends the first credential information to the second terminal 120. Alternatively, the network identifier may be generated by default by the first terminal 110 on the sending interface where the first terminal 110 sends the first credential information to the second terminal 120. The sending interface is displayed on the first terminal 110.

As another example, the application module 111 of the first terminal 110 may further send a second credential download request to the server in response to an instruction to apply a networking credential for the terminal (referring to the first terminal in the embodiment of the present disclosure). The second credential download request carries the user identity information provided by the first terminal 110. Correspondingly, the first terminal 110 includes a storage module 113 and a network connection module 114, in addition to the application module 111. The server 130 performs user identity verification on the first terminal 110 based on the user identity information, and sends the second credential information to the first terminal 110 if the user identity verification of the first terminal 110 is successful. The first terminal 110 receives the second credential information through the application module 111, stores the second credential information in a secure storage area of the first terminal 110 through the storage module 113, and connects to the wireless network by using the second credential information in the secure storage area of the first terminal 110 through the network connection module 114.

In the above examples, the credential information for connecting to the wireless network may be a network connection password, which is generally applicable to a WIFI network environment, and is also applicable to a network environment of a WAPI pre-shared key type. In this case, the network provider does not need to announce the credential information for networking (such as a network connection password) to the user of the second terminal when the second terminal is to connect to the wireless network, thereby avoiding the potential risk to the wireless network security caused by leakage of the credential information. In addition, the user of the second terminal can complete the network connection without manually inputting the credential information for networking (such as the network connection password) on the second terminal, thereby improving the convenience of the terminal networking.

As another example, in a case that the first credential information is certificate data, the second terminal 120 may further include a certificate management module 122, in addition to the application module 121, the storage module 123, and the network connection module 124. The certificate management module 122 may be configured to name the certificate data according to a certificate identifier set for the certificate data before the first certificate information is stored in the secure storage area of the second terminal 120, and call the storage module 123 to store the named certificate data in the secure storage area of the second terminal 120.

Similarly, in a case that the second certificate information is certificate data, the first terminal 110 may further include a certificate management module 112, in addition to the application module 111, the storage module 113, and the network connection module 114. The certificate management module 112 may be configured to name the certificate data according to the certificate identifier set for the certificate data before the second certificate information is stored in the secure storage area of the first terminal 110, and call the storage module 113 to store the named certificate data in the secure storage area of the first terminal 110.

In the first terminal 110, the application module 111 generally runs in an application layer, and the certificate management module 112, the storage module 113 and the network connection module 114 run in a system layer. Similarly, in the second terminal 120, the application module 121 generally runs in the application layer, and the certificate management module 122, the storage module 123, and the network connection module 124 run in the system layer. For either the application module 111 or the application module 121, the module may be built in the terminal when the terminal leaves the factory, or may be acquired by the user from the outside and installed in the terminal after the terminal leaves the factory. The application module 111 or the application module 121 may run in the terminal as a third-party application (APP), that is, the third-party application APP including the application module 111 or the application module 121 may be installed in the terminal to facilitate the terminal to execute networking operations. Of course, the application module 111 and the application module 121 may also run in the system layer, and the application module 111 and the application module 121 running in the system layer are built in the terminal when the terminal leaves the factory.

It should be noted here that the module running in the application layer may be acquired from the outside and installed in the terminal by the user, or may be uninstalled from the terminal by the user; the module running in the system layer is built in the terminal system, and cannot be uninstalled by the user. Moreover, the modules running in the system layer have different operating rights.

Those skilled in the art should understand that the schematic diagram shown in FIG. 1 illustrates only one example in which the embodiments of the present disclosure may be implemented. The scope of the embodiments of the present disclosure is not limited by FIG. 1.

Various possible implementations of the present disclosure will be described in detail below according to embodiments with reference to the accompanying drawings.

Figure 2:
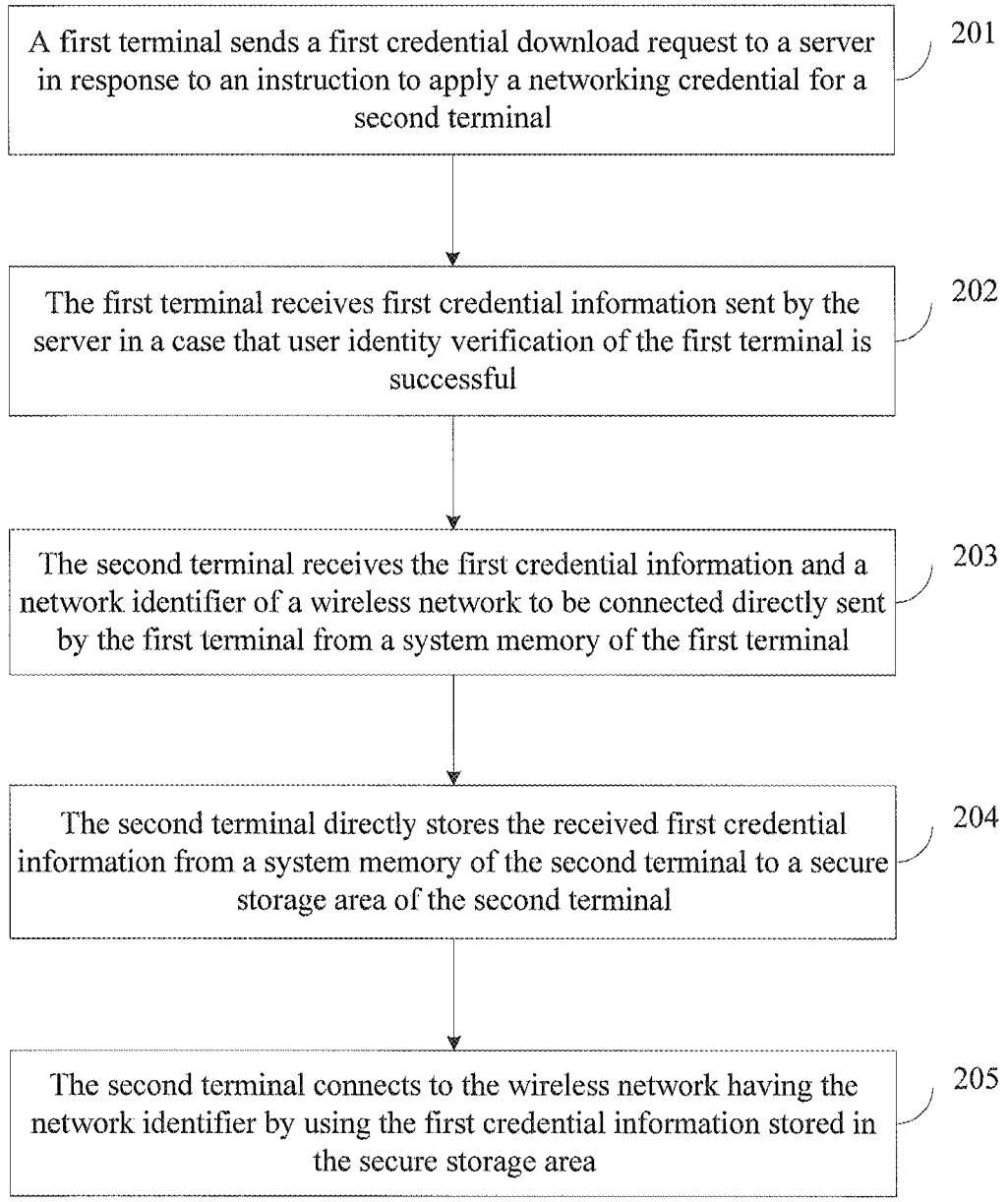
FIG. 2 is a flowchart of a credential information processing method for network connection according to an embodiment of the present disclosure.

Reference is made to FIG. 2, which shows a schematic flowchart of a credential information processing method for network connection according to an embodiment of the present disclosure. In the embodiment, the method includes the following steps 201 to 205.

In step 201, a first terminal sends a first credential download request to a server in response to an instruction to apply a networking credential for a second terminal.

The first credential download request carries user identity information of the first terminal, and the user identity information is used by the server to perform user identity verification on the first terminal.

In a specific implementation, for example, a credential download interface provided by the first terminal includes two operation options: "Apply Networking Credential for This Terminal" and "Apply Networking Credential for Other Terminal". The wireless network provider may select the operation option of "Apply Networking Credential for Other Terminal" on the credential download interface, and then trigger an instruction to apply for a networking credential for other terminal, which refers to the instruction to apply for a networking credential for the second terminal in the embodiment of the present disclosure. Schematically, on the credential download interface, the wireless network provider may input a user name and a password as the user identity information of the first terminal, and may also input an Internet Protocol (IP) address and a port number of the server. In addition, the wireless network provider may select the operation option of "Apply Networking Credential for This Terminal" or "Apply Networking Credential for Other Terminal". Of course, in step 201, the wireless network provider selects the operation option of "Apply Networking Credential for Other Terminal" on the credential download interface. Based on the operation of the wireless network provider on the credential download interface, the first terminal generates a first certificate download request carrying the user identity information and sends the request to the server. In response to the first credential download request, the server may obtain the user identity information and perform user identity verification on the first terminal according to the user identity information.

In a case that the user identity information includes a user name and a password, the server may verify the user identity of the first terminal as follows. For example, the server verifies whether the user name and password are legal and match with each other. If the user name and password are legal and match with each other, the user identity verification of the first terminal is successful.

In step 202, the first terminal receives the first credential information sent by the server in a case that the user identity verification of the first terminal is successful.

In a specific implementation, if the user identity verification of the first terminal is successful, the server may generate or acquire (for example, acquire from a certificate issuing server) the first credential information and send the first credential information to the first terminal, and thus the first terminal receives the first credential information sent by the server. The server may generate or obtain the first credential information based on a verification result of the user identity information of the first terminal.

In some embodiments, in order to ensure the security of the first credential information in a network transmission process, the first credential information may be encrypted during transmission between the first terminal and the server. Step 202 may include that: the first terminal receives first encrypted information sent by the server in a case that the user identity verification of the first terminal is successful; and the first terminal decrypts the first encrypted information to obtain the first credential information. The first encrypted information is obtained by encrypting the first credential information by the server. The first credential information may be encrypted by any feasible encryption method, and the encryption method is not limited in the present embodiment.

It can be understood that, in a general case, when a terminal receives a certificate or a file, the certificate or file is stored in the terminal; and when the certificate or file needs to be sent to other terminals, the terminal obtains the certificate or file from a local storage location for transmission. Practically, there may be an unsecure application in the first terminal, and the security of the wireless network may be threatened if the unsecure application obtains the first credential information from the first terminal. In order to prevent the first credential information from being leaked in the first terminal, in some embodiments, after receiving the first credential information, the first terminal may send the first credential information directly from a system memory of the first terminal to the second terminal without storing the first credential information in other storage locations in the first terminal. Because the first credential information is temporarily stored in the traditional storage location in the first terminal, the first credential information may be read or duplicated by the unsecure application in the first terminal. The first credential information is directly sent from the system memory of the first terminal to the second terminal, the unsecure application in the first terminal can be prevented from reading or duplicating the first credential information. Therefore, the security of the first credential information can be better protected.

In step 203, the second terminal receives the first credential information and a network identifier of a wireless network to be connected directly sent by the first terminal from the system memory of the first terminal.

In a specific implementation, after the first terminal receives the first credential information, the first terminal may prompt the wireless network provider through the credential sending interface. The wireless network provider may trigger a sending instruction carrying the network identifier and the first credential information on the credential sending interface provided by the first terminal. The first terminal sends the network identifier and the first credential information to the second terminal in response to the sending instruction. The network identifier of the wireless network may be a network identifier set by default, and the first terminal obtains the network identifier and provides the network identifier on the credential sending interface. Alternatively, the network identifier may be manually inputted by the wireless network provider on the credential sending interface.

It can be understood that the wireless network provider sends the network identifier of the wireless network to the second terminal together with the first credential information by using the first terminal, so that the second terminal may directly and automatically select the wireless network having the network identifier when connecting to the wireless network by using the first credential information. In this process, the user of the second terminal does not need to manually click and select the wireless network having the network identifier from multiple wireless network names on the second terminal (for example, in the "setting" of the second terminal), and then perform the wireless network connection. The network identifier of the wireless network may be a display name of the wireless network. For example, the network identifier of the wireless network may be a Service Set Identifier (SSID) of the wireless network.

As an example, the first terminal may send the first credential information to the second terminal by using a technology of point-to-point wireless communication without networking. Preferably, the first terminal may send the first credential information to the second terminal by using a near field communication (NFC) technology, and the second terminal may receive the first credential information sent by the first terminal by using the near field communication (NFC) technology. The first credential information is transmitted by the NFC technology, and the first terminal and the second terminal can transmit the first credential information only by getting close to each other. Certainly, the first credential information may be transmitted between the first terminal and the second terminal by using other technologies of point-to-point wireless communication, such as the Bluetooth technology. However, when using Bluetooth transmission, it is required to search and configure the connection between the terminals in advance, and the credential information can be sent only after the connection is successful. With the NFC technology, the credential information can be transmitted as long as the terminals get close to each other. Therefore, it is more convenient and faster to transmit the credential information by using the NFC technology. In addition, when using the NFC technology for transmission, a distance between terminal devices is short, and the terminal devices need to get close to each other, so the credential information is not easily intercepted during the transmission, and the transmission process is relatively safe.

It should be noted here that, in various embodiments of the present disclosure, preferably, the credential information is transmitted between the terminals by using the NFC technology. However, the embodiments of the present disclosure do not limit the way in which the credential information is transmitted, and the credential information may also be transmitted by adopting other technologies of point-to-point wireless communication, such as Bluetooth technology.

In step 204, the second terminal directly stores the received first credential information from the system memory of the second terminal to a secure storage area of the second terminal.

It can be understood that, in a general case, when a terminal receives a certificate or a file, the certificate or file is stored in the terminal; and when the certificate or file needs to be sent to other terminals, the terminal obtains the certificate or file from the local storage location for transmission. Practically, there may be an unsecure application in the second terminal, and the security of the wireless networks may be threatened if the unsecure application obtains the first credential information in the second terminal. In order to prevent the leakage of the first credential information in the second terminal, in some embodiments, after receiving the first credential information, the second terminal may directly store the first credential information from the system memory of the second terminal to the secure storage area of the second terminal without temporarily storing the first credential information in other traditional storage locations in the second terminal. Because the first credential information is temporarily stored in the traditional storage location in the second terminal, the first credential information may be read or duplicated by the unsecure application in the second terminal. The first credential information is directly stored to the secure storage area of the second terminal from the system memory of the second terminal, the unsecure application in the second terminal can be prevented from reading or duplicating the first credential information. Therefore, the security of the first credential information can be better protected.

In the embodiment of the present disclosure, the secure storage area may be different from the traditional hard disk storage, and the secure storage area may be a separate storage area in the terminal. On one hand, in the storage area, the credential information is not stored in a form of file, but the credential information can only be stored in a form of data. Therefore, a file management tool with a file scanning function (for example, an RE file manager, and an ES file browser) cannot view the credential information by scanning, so the data stored in the area is invisible to the user and cannot be copied. On the other hand, the storage area can only be accessed by using a specific interface provided by the system, and any API related to file operations cannot access the storage area. Therefore, in the embodiment of the present disclosure, it is more secure to store the credential information in the secure storage area in the terminal, as compared with the conventional hard disk storage. The secure storage area may also be non-hardware, such as the keystore of an Android system, and a system storage area of a Windows system. A hardware security chip may be used to implement the function of the secure storage area. Since the first credential information is stored in the secure storage area, the first credential information cannot be scanned by the file management tool, and cannot be accessed by the API related to the file operation, thereby preventing the first credential information from being leaked in the second terminal. In this way, the security of the first credential information is better protected. It should be noted here that the secure storage area described above not only refers to the secure storage area of the second terminal, and the secure storage area of the first terminal also has the same function.

As an example, in order to make the first credential information more secure, the first credential information may be encrypted and then stored in the secure storage area. When the second terminal reads the encrypted first credential information from the secure storage area, the encrypted first credential information is required to be decrypted, and then the wireless network is connected by using the decrypted first credential information.

In step 205, the second terminal connects to the wireless network having the network identifier by using the first credential information in the secure storage area.

In a specific implementation, after receiving the network identifier and the first credential information, the second terminal can determine the wireless network having the network identifier and send a connection request to an access point of the wireless network, so as to be connected to the wireless network through the access point of the wireless network.

In the present embodiment, the mentioned wireless network may be any feasible wireless communication technology. Wireless networks of different wireless communication technologies correspond to different kinds of credential information, so the credential information mentioned in the present embodiment may have multiple types. For example, if the wireless network adopts a wireless LAN authentication and privacy infrastructure (WAPI) mode, the first credential information may be WAPI certificate data. For another example, if the wireless network adopts a WIFI mode and an encryption mode is WPA/WPA2PSK, the first credential information may be a password. For a further example, if the wireless network adopts the WIFI mode and the encryption mode is 802.1×EAP, the first credential information may include CA certificate data and other credential parameters. The other credential parameters for example include a specific EAP method (such as PEAP, TLS, TTLS, PWD), phase 2 identity authentication (such as MSCHAPV2, GTC), identity, anonymous identity, and password.

It can be understood that, for different kinds of first credential information, the first credential information may be processed in different manners when the first terminal connects to the wireless network.

As an example, if the first credential information is a password or other credential information that does not belong to a certificate, the second terminal may directly store the credential information itself and connect to the wireless network by using the credential information itself, or the second terminal may directly connect to the wireless network by using the credential information itself.

As another example, if the first credential information is a certificate such as a WAPI certificate or a CA certificate, the second terminal may install the certificate, that is, store the certificate data, and connect to the wireless network by using the certificate data. If the first certificate information includes the certificate data, the second terminal may name the certificate data according to the certificate identifier set for the certificate data before storing the first certificate information in the secure storage area of the second terminal in step 204. Correspondingly, in step 204, the named certificate data is stored in the secure storage area of the second terminal. In step 205, the wireless network having the network identifier is connected by using the certificate data in the secure storage area.

The certificate data may be WAPI certificate data corresponding to the WAPI networking mode, or may be WIFI certificate data corresponding to the WIFI networking mode. A certificate used by a wireless network for networking usually includes a set of certificates containing multiple pieces of certificate data. In the embodiments of the present disclosure, the WAPI certificate data for networking refers to a set of WAPI certificate data. For example, a set of WAPI certificate data in the embodiment of the present disclosure includes user certificate data, issuer certificate data, and a user private key. In order to search for the WAPI certificate data more convenient when connecting to wireless network, the second terminal may name a set of WAPI certificate data, that is, setting a certificate name, i.e., a certificate identifier, for the WAPI certificate data. After the naming process is performed, the user certificate data, the issuer certificate data, and the user private key in the WAPI certificate data share the same certificate identifier.

For example, in a case that NAME1 functions as the certificate identifier and a set of WAPI certificate data for networking is named, the user certificate data is set to be "WAPI_USRCERT_NAME1", the issuer certificate data is set to be "WAPI_CACERT_NAME1", and the user private key is set to be "WAPI_USRPKEY_NAME1". In this case, the names of the three pieces of certificate data in a set of WAPI certificate data each include the certificate identifier "NAME1". Therefore, when searching for WAPI certificate data subsequently, the second terminal only needs to find the certificate identifier "NAME1", thereby obtaining a complete set of WAPI certificate data.

As an example, in a case that certificate data is to be named, the certificate identifier may be an identifier set by the user. When the certificate needs to be installed, the user may input the certificate identifier on the certificate naming interface provided by the second terminal and trigger the installation of the certificate. The second terminal names the certificate data according to the inputted certificate identifier.

As another example, the certificate identification may be automatically assigned or generated by the second terminal. When the certificate needs to be installed, the second terminal may display the certificate identifier automatically assigned or generated to the user, and automatically trigger the installation of the certificate after naming the certificate data according to the certificate identifier automatically assigned or generated.

In the present embodiment, the second terminal may connect to the wireless network by using the certificate data under a manual operation of the user, that is, a manual connection mode. Alternatively, the second terminal may automatically connect to the wireless network by using the certificate data, that is, an automatic connection mode.

In the manual connection mode, the certificate data to be used may be found by the second terminal based on the certificate identifier selected manually by the user. The network connection mode in step 205 includes that: the second terminal enumerates the certificate identifiers of all certificate data in the secure storage area in response to the manual connection instruction, reads the corresponding certificate data based on the certificate identifier selected manually by the user, and connects to the wireless network by using the read certificate data.

In the automatic connection mode, the certificate data to be used may be found automatically by the second terminal. The network connection mode in step 205 includes that, in response to the automatic connection instruction, the second terminal searches the secure storage area for the certificate data for connecting to the wireless network, and connects to the wireless network by using the found certificate data.

Taking the WAPI certificate data as an example (note: other types of certificate data is applicable), when the second terminal searches the secure storage area for the certificate data for networking, the second terminal first needs to read all the WAPI certificate data in the secure storage area and store the data in the memory temporarily, and then associates with the external wireless access point AP. After receiving the authentication activation packet sent by the AP, the second terminal obtains a field of "local ASU (Authentication Service Unit) identity" in the packet, then traverses all the WAPI certificate data previously read, obtains "holder name", "issuer name" and "serial number" from the issuer certificate data in each set of WAPI certificate data, and use the three pieces of information to constitute "identity" information. In a case that it is determined that the "identity" information from a certain set of WAPI certificate data matches the "local ASU identity" field in the authentication activation packet, the set of WAPI certificate data is used for network connection.

It should be noted that since the authentication activation packet sent by AP has timeliness, the second terminal needs to first read the certificate data in the secure storage area and temporarily store the data in the memory. After obtaining the "local ASU identity" field in the authentication activation packet, the second terminal traverses the certificate data from the memory to obtain the "identity" information, thereby greatly reducing the time spent, and thus avoiding the failure of the authentication activation packet.

For the case that the first credential information includes certificate data, as shown in FIG. 1, the second terminal 120 may cooperate with other modules by using the certificate management module 122 to store and use the certificate data.

Taking the WAPI certificate data as an example (note: other types of certificate data is applicable), after the second terminal 120 receives the first certificate information through the application module 121, the application module 121 may call the certificate installation interface of the certificate management module 122 and provide interface parameters of the certificate installation interface. The interface parameters may include user certificate data, issuer certificate data, and a user private key in the WAPI certificate data. The certificate installation interface of the certificate management module 122 opens the certificate naming interface and displays a default certificate identifier on the certificate naming interface. Alternatively, the user may modify the certificate identifier on the certificate naming interface. After the certificate installation interface of the certificate management module 122 obtains the user certificate data, the issuer certificate data, and the user private key from the interface parameters, the user certificate data, the issuer certificate data and the user private key are named according to the default certificate identifier or the certificate identifier inputted on the certificate naming interface. Then the certificate management module 122 calls the storage module 123, and the storage module 123 stores the named certificate data in the secure storage area according to naming rules of the certificate management module 122, thereby completing the certificate installation process.

After the certificate installation is completed and if the manual connection mode is adopted, the network connection module 124 calls a certificate enumeration interface of the certificate management module 122 to enumerate and present the certificate identifiers of all certificate data in the secure storage area. After the user selects the target certificate identifier, the network connection module 124 calls the storage module 123 to search the secure storage area for the certificate data that matches the target certificate identifier, and then the network connection module 124 connects to the wireless network based on the wireless network driver and using the found certificate data.

It should be noted that, the certificate naming interface is provided by the certificate management module 122 running in the system layer, rather than the application module 121 running in the application layer. The certificate naming interface provided by the certificate management module of the system layer usually cannot be controlled and operated maliciously by the unsafe application of the application layer, thereby avoiding that the unsafe application of the application layer maliciously inputs the name on the naming interface to perform the operation of certificate installation or certificate deletion.

Taking the WAPI certificate data as an example (note: other types of certificate data is applicable), based on the Android system adopted by the terminal of the embodiments of the present disclosure, instead of adding a new class to the network configuration interface of the network connection module 124, the compatibility with WAPI can be achieved by modifying the original WLAN network configuration interface of Android (including modifying the WifiConfiguration class and its subclass KeyMgmt), and manual connection and automatic connection are provided. Some member variables may be added under the WifiConfiguration class, including wapiPskType, wapiPsk, wapiCertSelMode, and wapiCertSel. wapiPskType is used to describe a key type of WAPI pre-shared key, wapiPsk is used to describe the content of WAPI pre-shared key, wapiCertSelMode is used to describe the selection mode of the WAPI certificate, and wapiCertSel is used to describe the certificate identifier of the WAPI certificate selected in a manual mode. wapiCertSelMode and wapiCertSel are adopted in the case of using the WAPI certificate to connect to the network, and wapiPskType and wapiPsk are adopted in the case of using the key to connect to the network. WAPI_PSK and WAPI_CERT may be added under the KeyMgmt class to describe the definition of the WAPI pre-shared key type and the definition of the WAPI certificate type respectively. For example, WAPI_PSK and WAPI_CERT may be added under the KeyMgmt class: public static final int WAPI_PSK=190; public static final int WAPI_CERT=191.

It should be noted that, on the basis of the Android system, if the network connection module needs to implement two different networking modes, i.e., automatic connection and manual connection, for the key mode, some new member variables needs to be added under the WifiConfiguration class, including a member variable describing the key selection mode and a member variable describing the identity of the key selected in the manual mode.

In addition, in order to improve security, in the second terminal 120, modules calling the storage module 123 run with different user identities. Different user identities correspond to different operation rights. For example, a module, which runs as a system user, can install a certificate for the terminal, can delete the certificate data installed in the terminal, and can enumerate the certificate identifiers, but cannot read the certificate data in the terminal. A module, which runs as a wlan user, can read the certificate data and obtain the certificate identifier of the certificate in the terminal. For example, the certificate management module 122 runs as a system user, and the network connection module 124 runs as a wlan user. The certificate management module 122 can call the storage module 123 to install the certificate data for the terminal, can call the storage module 123 to delete the certificate data installed in the terminal and enumerate the certificate identifiers, but cannot call the storage module 123 to read the certificate data in the terminal. The network connection module 124 can call the storage module 123 to read the certificate data and the certificate identifier in the terminal, but cannot call the storage module 123 to delete or install the certificate data.

In order to enable the certificate management module 122 to perform the operations of installing or deleting the certificate data, and enumerating the certificate identifiers, as an example, a certificate installation interface, a certificate deletion interface and a certificate identifier enumeration interface of the certificate management module 122 may be designed according to the Intent mechanism of the Android system. Specifically, an Activity may be preset in the system, and a related Intent Action is defined.

For the WAPI certificate data (note: other types of certificate data is applicable), the related Intent Action includes: "com.wapi.certificate.INSTALL" for installing the WAPI certificate data, "com.wapi.certificate.GET_ALIASES" for enumerating the certificate identifiers, and "com.wapi.certificate.DELETE" for deleting the WAPI certificate data. The application module 121 or the application APP with a built-in application module 121 may send a corresponding Intent Action to the preset Activity in the system, and the Activity performs the operation of installing the certificate data, deleting the certificate data, or enumerating the certificate identifiers according to the corresponding Intent Action. The application module 121 or the application APP with the built-in application module 121 sends relevant parameters by using the putExtra function of the Intent, and the preset Activity in the system acquires the parameters sent by the application module 121 or the application APP with the built-in application module 121 through the getExtras function of the Intent. The definition of relevant parameters is shown in Table 1.

TABLE 1

| Intent Action | Name | Value and its type | Explanation of Value |
|---|---|---|---|
| com.wapi.certificate.INSTALL | USER_CERT | byte[ ] userCert | The content of the user certificate |
| | CA_CERT | byte[ ] caCert | The content of the issuer certificate |
| | PRIVATE_KEY | byte[ ] privateKey | The content of the user private key |
| | RESERVED_CERT | byte[ ] reservedCert | Reserved certificate |
| | ALIAS | String certDefaultAlias | The default certificate identifiers for the set of certificates |
| com.wapi.certificate.GET_ALIASES | None | None | None |
| com.wapi.certificate.DELETE | ALIAS | String certAlias | The certificate identifier of the certificate data to be deleted |

When the certificate data is to be installed, the following operations are required, including steps 1 to 3, after the preset Activity in the system receives Intent.

In step 1, the Bundle object is obtained through the getExtras function of the Intent, and then relevant parameters are obtained from the Bundle object.

In step 2, it is determined whether the set of WAPI certificate data to be installed matches (that is, determining whether the issuer certificate data and the user certificate data belong to one set). If the data does not match, the installation fails. A corresponding return value is set by the setResult function of the Activity. If the data matches, the Activity pops up an interactive interface, that is, the certificate naming interface, for the user to customize an alias for the set of certificate data, that is, the certificate identifier (the interactive interface displays a default alias carried in the Intent parameter transmitted from the application module 121 or the application APP with the built-in application module 121, and the user may choose to directly use the default alias). It should be noted that when the user customizes a certificate identifier of the certificate data on the interactive interface, the Activity determines whether the certificate identifier is duplicate with the alias of the installed certificate data. If the certificate identifier is duplicate with the alias of the installed certificate data, the user is prompted to re-edit.

In step 3, after the Activity obtains the certificate identifier finally confirmed by the user through the interactive interface, the operation of installing the WAPI certificate is performed. Then the corresponding return value is set by the setResult function of the Activity, to notify the application module 121 or the application APP with the built-in application module 121 of an installation result of the WAPI certificate data.

When the certificate data is to be installed, the return value set by the setResult function is defined as follows. A return value 1 represents that the installation is successful, and a return value 0 represents that the installation fails.

When the certificate data is to be deleted, the following operations are performed, including steps 1 and 2, after the preset Activity in the system receives Intent.

In step 1, the Bundle object is obtained through the getExtras function of the Intent, and then the relevant parameters are obtained from the Bundle object.

In step 2, it is determined whether the alias (that is, the certificate identifier) of the WAPI certificate data to be deleted is in an alias list of the installed certificate data. If the alias is not in the alias list, the deletion operation fails. A corresponding return value is set by the setResult function of the Activity. If the alias is in the alias list, the Activity pops up an interactive interface, allowing the user to confirm whether to delete the set of certificate data. After the user confirms to delete, the deletion operation is performed. The corresponding return value is set by the setResult function of the Activity, to notify the application module 121 or the application APP with the built-in application module 121 of a deletion result of the WAPI certificate data.

When the certificate data is to be deleted, the return value set by the setResult function is defined as follows. A return value 1 represents that the deletion is successful, and a return value 0 represents that the deletion fails.

When the certificate identifiers are to be enumerated, the following operations are performed, including steps 1 and 2, after the preset Activity in the system receives Intent.

In step 1, "certificate identifier array" is returned to a caller through the putExtra function of the Intent. The parameter format is shown in Table 2.

In step 2, the return value is set by the setResult function, and is defined as follows. A return value 1 represents that the enumeration is successful, and a return value 0 represents that the enumeration fails.

TABLE 2

| Intent Action | name | Value and its type | Explanation of Value |
| --- | --- | --- | --- |
| com.wapi.certificate.GET_ALIASES | ALIASES | String[ ] certAliasArray | An array of identifiers for installed certificates |

In the present embodiment, when the second terminal needs to connect to the wireless network by using the credential information, the first terminal having the credential application authority of the wireless network may request the server to download credential information of the wireless network and send the credential information to the second terminal. In this way, the second terminal can obtain the credential information of the wireless network without manual inputting by the user. The credential information (that is, the certificate data) may be named by using the default name generated by the terminal, the certificate may be automatically installed by the terminal, and the terminal automatically searches for the certificate data for networking and automatically connects to the network. It can be seen that, in the process of connecting to the wireless network by the second terminal, it is unnecessary to manually input the credential information by the user, the networking operation of the user is simplified, and the credential information is not required to be announced to the user using the second terminal to connect to the network, thereby avoiding the publishing of the credential information of the wireless network and improving the security of the wireless network.

It should be noted that, in a case that the second certificate information includes the certificate data, as shown in FIG. 1, the first terminal 110 may cooperate with other modules by using the certificate management module 112, to store and use the certificate data. The storage and use of the certificate data by the first terminal 110 is described above, the second terminal 120 stores and uses the certificate data in the same mode. The first terminal 110 and the second terminal 120 adopt the same design mechanism for the certificate management module, the storage module, and the network connection module, and details are not described herein again.

Figure 3:
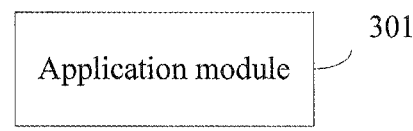
FIG. 3 is a schematic structural diagram of a credential information processing apparatus for network connection according to an embodiment of the present disclosure.

Reference is made to FIG. 3, which is a schematic structural diagram of a credential information processing apparatus for network connection according to an embodiment of the present disclosure. The apparatus is applied in the first terminal. The apparatus may include an application module 301.

The application module 301 is configured to send a first credential download request to a server in response to an instruction to apply a networking credential for a second terminal, receive first credential information sent by the server in a case that user identity verification is successful, and send the first credential information and a network identifier of a wireless network to be connected directly from a system memory of the first terminal to the second terminal.

Alternatively, the application module 301 is configured to send a second credential download request to the server in response to an instruction to apply a networking credential for the first terminal, and receive second credential information sent by the server in a case that the user identity verification is successful.

The first credential download request or the second credential download request carries the user identity information of the first terminal, and the user identity information is used by the server to perform user identity verification on the first terminal. The first credential information is used by the second terminal to connect to the wireless network having the network identifier, and the second credential information is used by the first terminal to connect to the wireless network.

Optionally, the application module 301 is further configured to send the first credential information and the network identifier to the second terminal by using a technology of point-to-point wireless communication without networking.

Figure 4:
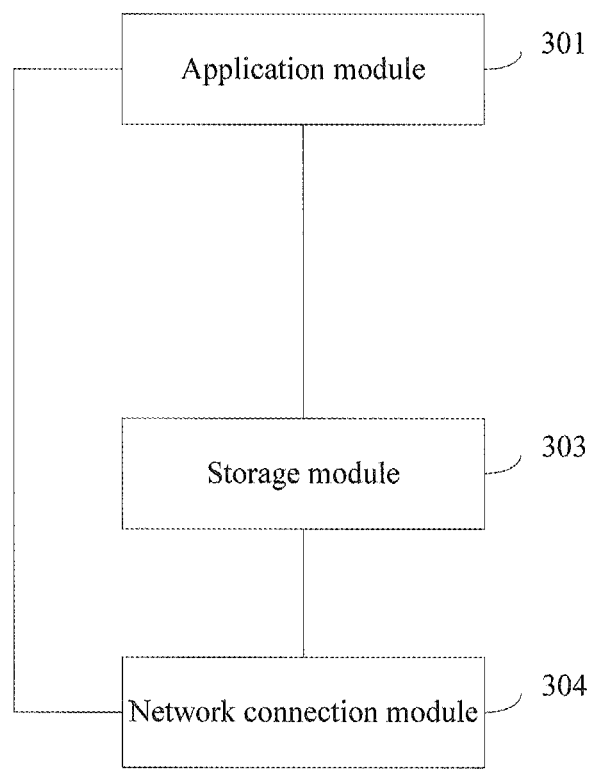
FIG. 4 is a schematic structural diagram of a credential information processing apparatus for network connection according to an embodiment of the present disclosure.

Optionally, as shown in FIG. 4, the apparatus may further include a storage module 303, and a network connection module 304.

The storage module 303 is configured to store the second credential information directly from the system memory of the first terminal to the secure storage area of the first terminal.

The network connection module 304 is configured to connect to the wireless network by using the second credential information stored in the secure storage area.

Figure 5:
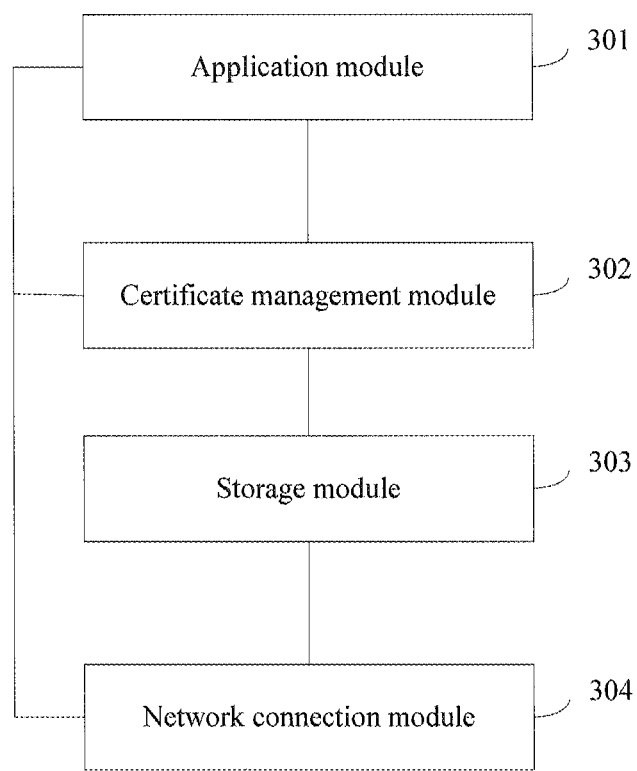
FIG. 5 is a schematic structural diagram of a credential information processing apparatus for network connection according to an embodiment of the present disclosure.

Optionally, the second credential information includes certificate data. In this case, the apparatus further includes a certificate management module 302 as shown in FIG. 5.

The certificate management module 302 is configured to name the certificate data according to the certificate identifier set for the certificate data before the second certificate information is stored directly from the system memory of the first terminal to the secure storage area of the first terminal, and call the storage module 303 to store the named certificate data directly from the system memory of the first terminal to the secure storage area of the first terminal.

Optionally, the certificate management module 302 is further configured to name each piece of the data included in the certificate data by using the certificate identifier, so that the data included in the certificate data has the same certificate identifier. The data included in the certificate data includes user certificate data, issuer certificate data and a user private key.

Optionally, modules calling the storage module 303 run with different user identities. Different user identities correspond to different operation rights.

The certificate management module 302 runs as a system user, and its operation rights include that: the certificate management module 302 can call the storage module 303 to install or delete the certificate data and enumerate the certificate identifiers, and the certificate management module 302 cannot call the storage module 303 to read the certificate data.

The network connection module 304 runs as a wlan user, and its operation rights include that: the network connection module 303 can call the storage module 303 to read the certificate data and the certificate identifier, and the network connection module 304 cannot call the storage module 303 to install or delete the certificate data.

Optionally, in a case that the certificate management module 302 calls the storage module 303 to install or delete the certificate data, and enumerate the certificate identifiers, a certificate installation interface, a certificate deletion interface, and a certificate identifier enumeration interface of the certificate management module 302 are designed according to the Intent mechanism of the Android system. The Intent mechanism includes:

presetting an Activity in the system and defining an Intent Action related to installing the certificate data, deleting the certificate data, and enumerating the certificate identifiers; and sending, by the application module 301, the Intent Action to the Activity, where the Activity performs the operation of installing the certificate data, deleting the certificate data, or enumerating the certificate identifiers according to the Intent Action.

Optionally, the network connection module 304 is further configured to:

in response to an automatic connection instruction, call the storage module 303 to search the secure storage area for the certificate data for connecting to the wireless network, and connect to the wireless network by using the found certificate data; or in response to a manual connection instruction, call the certificate management module 302 to enumerate the certificate identifiers of all the certificate data in the secure storage area, call the storage module 303 to read the corresponding certificate data based on the manually selected certificate identifier, and connect to the wireless network by using the read certificate data.

Optionally, in a case that the certificate data is WAPI certificate data and the network connection module 304 calls, in response to the automatic connection instruction, the storage module 303 to search the secure storage area for the certificate data for connecting to the wireless network, the network connection module 304 is configured to call the storage module 303 to read WAPI certificate data in the secure storage area;

the network connection module 304 is configured to associate with the wireless access point AP, receive the authentication activation packet sent by the wireless access point AP, and obtain an identity field of the local authentication service unit ASU in the authentication activation packet;

the network connection module 304 is configured to obtain the identity information of the WAPI certificate data by traversing the read WAPI certificate data; and the network connection module 304 is configured to determine that the WAPI certificate data corresponding to the identity information is the certificate data for connecting to the wireless network, in a case that the identity information is determined to match the identity field of the local authentication service unit ASU.

Optionally, the network configuration interface of the network connection module 304 is obtained by modifying the WifiConfiguration class of the Android system. The modified WifiConfiguration class includes: a member variable describing a key type of a pre-shared key, a member variable describing content of the pre-shared key, a member variable describing a certificate selection mode, and a member variable describing a certificate identifier of the certificate selected in a manual mode.

Optionally, in a case that the certificate data is WAPI certificate data, the network configuration interface of the network connection module 304 is further obtained by modifying a KeyMgmt subclass of the WifiConfiguration class. The modified KeyMgmt subclass includes a definition of a WAPI pre-shared key type and a definition of a WAPI certificate type.

It should be noted that, for storage and use of the second credential information by the credential management module, the storage module and the network connection module in the first terminal in a case that the first terminal performs networking by using the second credential information, one may refer to specific storage and use of the first credential information by the certificate management module, the storage module and the network connection module in the second terminal in a case that the second terminal performs networking by using the first credential information. Details are not described herein again.

In the present embodiment, when the first terminal needs to connect to the wireless network by using the credential information, the first terminal having the credential application authority of the wireless network may request the server to download the credential information of the wireless network, so that the first terminal can obtain the credential information of the wireless network without manual inputting by the user, and can connect to the wireless network by using the credential information. It can be seen that, in the process of connecting to the wireless network by the first terminal, it is unnecessary to manually input the credential information by the user, the networking operation is simplified, and the credential information is not required to be published, thereby avoiding the leakage of the credential information of the wireless network and improving the security of the wireless network.

Figure 6:
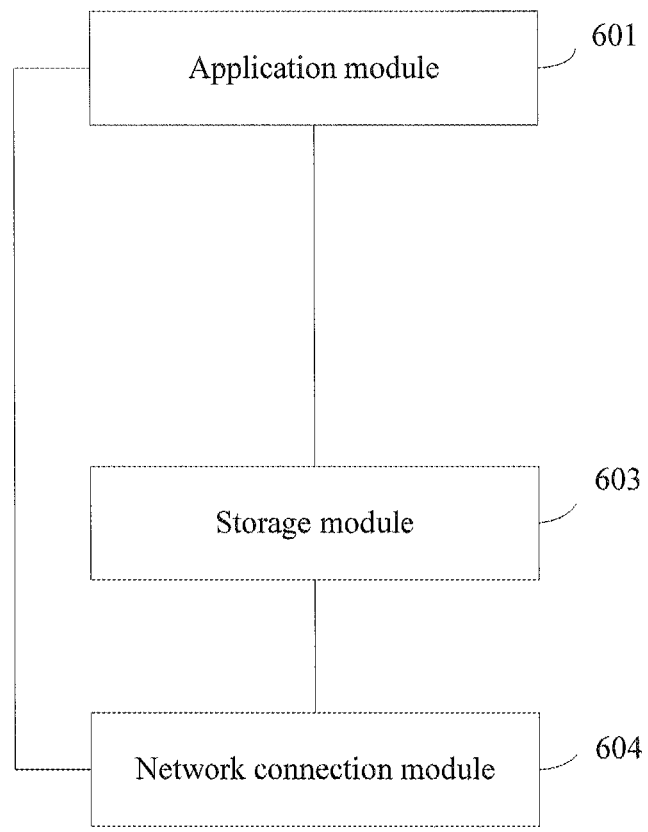
FIG. 6 is a schematic structural diagram of a credential information processing apparatus for network connection according to an embodiment of the present disclosure.

Reference is made to FIG. 6, which is a schematic structural diagram of a credential information processing apparatus for network connection according to an embodiment of the present disclosure. The apparatus is applied in the second terminal. The apparatus may include an application module 601, a storage module 603, and a network connection module 604.

The application module 601 is configured to receive the first credential information and the network identifier of the wireless network to be connected sent by the first terminal. The first credential information is downloaded from the server and is sent to the second terminal by the first terminal in response to an instruction to apply a network credential for the second terminal.

The storage module 603 is configured to store the first credential information directly from the system memory of the second terminal to the secure storage area of the second terminal.

The network connection module 604 is configured to connect to the wireless network having the network identifier by using the first credential information in the secure storage area.

Optionally, the application module 601 is further configured to receive the first credential information and the network identifier sent by the first terminal by using a technology of point-to-point wireless communication without networking.

Figure 7:
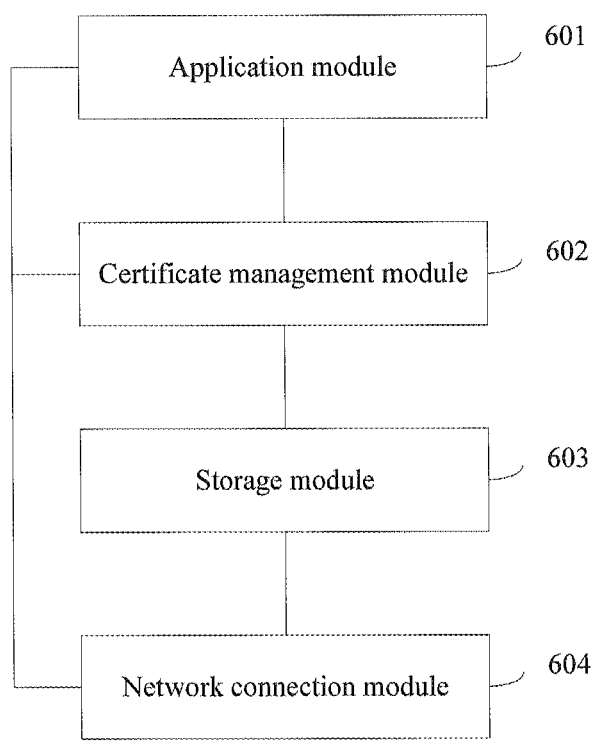
FIG. 7 is a schematic structural diagram of a credential information processing apparatus for network connection according to an embodiment of the present disclosure.

Optionally, the first credential information includes certificate data. In this case, the apparatus further includes a certificate management module 602 as shown in FIG. 7.

The certificate management module 602 is configured to name the certificate data according to the certificate identifier set for the certificate data before the first certificate information is stored directly from the system memory of the second terminal to the secure storage area of the second terminal, and call the storage module 603 to store the named certificate data directly from the system memory of the second terminal to the secure storage area of the second terminal.

Optionally, the certificate management module 602 is further configured to name each piece of the data included in the certificate data by using the certificate identifier, so that the data included in the certificate data has the same certificate identifier. The data included in the certificate data includes user certificate data, issuer certificate data and a user private key.

Optionally, modules calling the storage module 603 run with different user identities. Different user identities correspond to different operation rights.

The certificate management module 602 runs as a system user, and its operation rights include that: the certificate management module 602 can call the storage module 603 to install or delete the certificate data and enumerate the certificate identifiers, and the certificate management module 602 cannot call the storage module 603 to read the certificate data.

The network connection module 604 runs as a wlan user, and its operation rights include that the network connection module 604 can call the storage module 603 to read the certificate data and the certificate identifier, and cannot call the storage module 603 to install or delete the certificate data.

Optionally, in a case that the certificate management module 602 calls the storage module 603 to install or delete the certificate data, and enumerate the certificate identifiers, a certificate installation interface, a certificate deletion interface, and a certificate identifier enumeration interface of the certificate management module 602 are designed according to the Intent mechanism of the Android system. The Intent mechanism includes:

presetting an Activity in the system and defining an Intent Action related to installing the certificate data, deleting the certificate data, and enumerating the certificate identifiers; and sending, by the application module 601, the Intent Action to the Activity, where the Activity performs the operation of installing the certificate data, deleting the certificate data, or enumerating the certificate identifiers according to the Intent Action.

Optionally, the network connection module 604 is further configured to:

in response to the automatic connection instruction, call the storage module 603 to search the secure storage area for the certificate data for connecting to the wireless network, and connect to the wireless network by using the found certificate data; or in response to the manual connection instruction, call the certificate management module 602 to enumerate the certificate identifiers of all the certificate data in the secure storage area, call the storage module 603 to read the corresponding certificate data based on the manually selected certificate identifier, and connect to the wireless network by using the read certificate data.

Optionally, in a case that the certificate data is WAPI certificate data and the network connection module 604 calls, in response to the automatic connection instruction, the storage module 603 to search the secure storage area for the certificate data for connecting to the wireless network, the network connection module 604 is configured to call the storage module 603 to read WAPI certificate data in the secure storage area;

the network connection module 604 is configured to associate with the wireless access point AP, receive the authentication activation packet sent by the wireless access point AP, and obtain the identity field of the local authentication service unit ASU in the authentication activation packet;

the network connection module 604 is configured to obtain the identity information of the WAPI certificate data by traversing the read WAPI certificate data; and the network connection module 604 is configured to determine that the WAPI certificate data corresponding to the identity information is the certificate data for connecting to the wireless network, in a case that the identity information is determined to match the identity field of the local authentication service unit ASU.

Optionally, the network configuration interface of the network connection module 604 is obtained by modifying the WifiConfiguration class of the Android system. The modified WifiConfiguration class includes: a member variable describing the key type of the pre-shared key, a member variable describing the content of the pre-shared key, a member variable describing the certificate selection mode, and a member variable describing the certificate identifier of the certificate selected in a manual mode.

Optionally, in a case that the certificate data is WAPI certificate data, the network configuration interface of the network connection module 604 is further obtained by modifying a KeyMgmt subclass of the WifiConfiguration class. The modified KeyMgmt subclass includes the definition of the WAPI pre-shared key type and the definition of the WAPI certificate type.

It should be noted that, for specific storage and use of the first credential information by the certificate management module, the storage module and the network connection module located in the second terminal in a case that the second terminal performs networking by using the first credential information, one may refer to the embodiments described above. Details are not described herein again.

In the present embodiment, when the second terminal needs to connect to the wireless network by using the credential information, the first terminal having the credential application authority of the wireless network may request the server to download the credential information of the wireless network, and the first terminal sends the credential information to the second terminal. In this way, the second terminal can obtain the credential information of the wireless network without manual inputting by the user, and can connect to the wireless network by using the credential information. It can be seen that, in the process of connecting to the wireless network by the second terminal, it is unnecessary to manually input the credential information by the user, the networking operation of the user is simplified, and the credential information is not required to be announced to the user using the second terminal to connect to the network, thereby avoiding the publishing of the credential information of the wireless network and improving the security of the wireless network.

In the embodiments of the present disclosure, the application module 111 in the first terminal 110 shown in FIG. 1, may be built in the first terminal 110 when the first terminal leaves the factory, or may be built in a third-party application APP. The user acquires the third-party application APP in which the application module 111 is built, and installs the APP in the terminal to perform the operation of networking. Therefore, according to an embodiment of the present disclosure, an application APP is further provided, which is applied in the first terminal. The application APP includes an application module.

The application module is configured to send a first credential download request to the server in response to an instruction to apply a networking credential for the second terminal, receive first credential information sent by the server in a case that the user identity verification is successful, and send the first credential information and the network identifier of the wireless network to be connected directly to the second terminal from the system memory of the first terminal.

Alternatively, the application module is configured to send a second credential download request to the server in response to an instruction to apply a networking credential for the first terminal, and receive second credential information sent by the server in a case that the user identity verification is successful.

The first credential download request or the second credential download request carries the user identity information of the first terminal. The user identity information is used by the server to perform user identity verification on the first terminal; the first credential information is used by the second terminal to connect to the wireless network having the network identifier; and the second credential information is used by the first terminal to connect to the wireless network.

Optionally, the application module is further configured to call the storage module of the first terminal to store the second credential information directly from the system memory of the first terminal to the secure storage area of the first terminal. The application module is further configured to call the network connection module of the first terminal to connect to the wireless network by using the second credential information stored in the secure storage area.

Optionally, the second credential information includes certificate data. Correspondingly, before the second certificate information is stored directly from the system memory of the first terminal to the secure storage area of the first terminal, the application module is further configured to call the certificate management module of the first terminal to name the certificate data according to the certificate identifier set for the certificate data. In this case, the certificate management module calls the storage module of the first terminal to store the named certificate data directly from the system memory of the first terminal to the secure storage area of the first terminal.

Optionally, the application module is further configured to call the network connection module of the first terminal to perform a network connection operation in response to the automatic connection instruction, so that the network connection module calls the storage module of the first terminal to search the secure storage area for the certificate data for connecting to the wireless network, and the network connection module connects to the wireless network by using the found certificate data.

Alternatively, the application module is further configured to call the network connection module of the first terminal to perform a network connection operation in response to the manual connection instruction, so that the network connection module calls the certificate management module of the first terminal to enumerate the certificate identifiers of all the certificate data in the secure storage area, and call the storage module of the first terminal to read the corresponding certificate data based on the manually selected certificate identifier, and connect to the wireless network by using the read certificate data.

It should be noted that the application APP applied in the first terminal according to the embodiment of the present disclosure, has the same function as the application module 111 shown in FIG. 1, and has the same function as the application modules shown in FIG. 3, FIG. 4 and FIG. 5. Details are not described herein again.

Similarly, the application module 121 in the second terminal 120 shown in FIG. 1, may be built in the second terminal 120 when the second terminal leaves the factory, or may be built in the third-party application APP. The user acquires the third-party application APP in which the application module 121 is built, and installs the APP in the terminal to perform the operation of networking. Therefore, according to an embodiment of the present disclosure, an application APP is further provided, which is applied in the second terminal. The application APP includes an application module.

The application module is configured to receive the first credential information and the network identifier of the wireless network to be connected sent by the first terminal. The first credential information is downloaded from the server and sent to the second terminal by the first terminal in response to the instruction to apply the networking credential for the second terminal.

The application module is configured to call the storage module of the second terminal to store the first credential information directly from the system memory of the second terminal to the secure storage area of the second terminal. The application module is further configured to call the network connection module of the second terminal to connect to the wireless network having the network identifier by using the first credential information stored in the secure storage area.

Optionally, the first credential information includes certificate data. In this case, before the first certificate information is stored directly from the system memory of the second terminal to the secure storage area of the second terminal, the application module is further configured to call the certificate management module of the second terminal to name the certificate data according to the certificate identifier set for the certificate data, so that the certificate management module calls the storage module of the second terminal to store the named certificate data directly from the system memory of the second terminal to the secure storage area of the second terminal.

Optionally, the application module is further configured to call the network connection module of the second terminal to perform a network connection operation in response to the automatic connection instruction, so that the network connection module calls the storage module of the second terminal to search the secure storage area for the certificate data for connecting to the wireless network, and connects to the wireless network by using the found certificate data.

Alternatively, the application module is further configured to call the network connection module of the second terminal to perform a network connection operation in response to the manual connection instruction, so that the network connection module calls the certificate management module of the second terminal to enumerate the certificate identifiers of all the certificate data in the secure storage area, call the storage module of the second terminal to read the corresponding certificate data based on the manually selected certificate identifier, and connect to the wireless network by using the read certificate data.

It should be noted that the application APP applied in the second terminal according to the embodiment of the present disclosure, has the same function as the application module 121 shown in FIG. 1, and has the same function as the application modules shown in FIG. 6 and FIG. 7. Details are not described herein again.

It should be noted that, in this context, relational terms such as first and second are used merely to distinguish one entity or operation from another entity or operation, and do not necessarily require or imply any such actual relationship or order between these entities or operations. The term "including", "comprising" or any other variations thereof are intended to cover a non-exclusive inclusion, thus a process, method, item or apparatus including a series of elements includes not only those elements, but also other elements not explicitly listed, or elements inherent in such a process, method, item or apparatus. Without further limitation, an element defined by the phrase "including a . . . " does not exclude the existence of additional identical elements in the process, method, article or apparatus including the element.

For the system embodiments, they basically correspond to the method embodiments. For the related parts between the system embodiments and the method embodiments, one may refer to the description of the method embodiments. The system embodiments described above are merely illustrative, and the units described as separate components may or may not be physically separate, and the components displayed as units may or may not be physical units, that is, they may be located in one place or may be distributed to multiple network units. Some or all of the modules can be selected according to the actual needs to achieve the purpose of the present embodiments. In each module and application APP according to the embodiments of the present disclosure, operations that can be implemented in codes can be attached to a non-transient computer readable storage medium. When instructions in the storage medium are executed by the processor of the terminal, the terminal is capable of executing various embodiments of the present disclosure. The embodiments can be understood and implemented by those skilled in the art without any creative work.

Only specific embodiments of the present disclosure are described above. It should be noted that those skilled in the art may make several improvements and modifications without departing from the principles of the present application. These improvements and modifications should be considered to fall within the scope of protection of this application.

The invention claimed is:

1. A credential information processing method for network connection, comprising:
    sending, by a first terminal, a first credential download request to a server in response to an instruction to apply a networking credential for a second terminal, wherein the first credential download request carries user identity information of the first terminal, and the user identity information is used by the server to perform user identity verification on the first terminal;
    receiving, by the first terminal, first credential information sent from the server in a case that the user identity verification is successful;
    receiving, by the second terminal, the first credential information and a network identifier of a wireless network to be connected directly sent by the first terminal from a system memory of the first terminal, wherein no processing is performed on the first credential information before the first credential information is sent to the second terminal;
    storing, by the second terminal, the received first credential information, directly to a secure storage area of the second terminal from a system memory of the second terminal; and
    connecting, by the second terminal, to the wireless network having the network identifier by using the first credential information in the secure storage area.

2. The method according to claim 1, wherein the first terminal sends the first credential information and the network identifier to the second terminal by adopting a technology of point-to-point wireless communication without networking, and the second terminal receives the first credential information and the network identifier sent by the first terminal by adopting a technology of point-to-point wireless communication without networking.

3. The method according to claim 1, wherein the first credential information comprises certificate data,
    and wherein before the storing the first credential information directly to the secure storage area of the second terminal from the system memory of the second terminal, the method further comprises:
    naming the certificate data based on a certificate identifier set for the certificate data by the second terminal,
    and wherein the storing the first credential information in the secure storage area of the second terminal comprises:
    storing the named certificate data in the secure storage area of the second terminal.

4. The method according to claim 3, wherein the naming the certificate data based on the certificate identifier set for the certificate data by the second terminal comprises:
    naming, by the second terminal, each piece of data comprised in the certificate data by using the certificate identifier, wherein the data comprised in the certificate data has a same certificate identifier, and the data comprises user certificate data, issuer certificate data and a user private key.

5. The method according to claim 3, wherein the connecting, by the second terminal, to the wireless network having the network identifier by using the first credential information comprises:

searching, by the second terminal, the secure storage area for the certificate data for connecting to the wireless network, in response to an automatic connection instruction, and connecting, by the second terminal, to the wireless network by using the found certificate data; or enumerating, by the second terminal, certificate identifiers of all certificate data in the secure storage area in response to a manual connection instruction, reading, by the second terminal, corresponding certificate data based on a manually selected certificate identifier, and connecting, by the second terminal, to the wireless network by using the read certificate data.

6. The method according to claim 5, wherein in a case that the certificate data is WAPI certificate data, the searching, by the second terminal, the secure storage area for the certificate data for connecting to the wireless network comprising:

reading, by the second terminal, WAPI certificate data in the secure storage area;

associating, by the second terminal, with a wireless access point AP, receiving, by the second terminal, an authentication activation packet sent by the wireless access point AP, and obtaining, by the second terminal, an identity field of a local authentication service unit ASU in the authentication activation packet;

obtaining, by the second terminal, identity information of the WAPI certificate data by traversing the read WAPI certificate data; and determining, by the second terminal, that the WAPI certificate data having the identity information is the certificate data for connecting to the wireless network in a case that the identity information is determined to match the identity field of the local authentication service unit ASU.

7. A credential information processing method for network connection, applied in a first terminal, comprising:

sending a first credential download request to a server in response to an instruction to apply a networking credential for a second terminal; receiving first credential information sent by the server in a case that user identity verification is successful; and sending the first credential information and a network identifier of a wireless network to be connected directly to the second terminal from a system memory of the first terminal, wherein no processing is performed on the first credential information before the first credential information is sent to the second terminal, wherein the first credential download request carries user identity information of the first terminal, and the user identity information is used by the server to perform user identity verification on the first terminal; and the first credential information is stored in a secure storage area of the second terminal and is used by the second terminal to connect to the wireless network having the network identifier.

8. The credential information processing method for network connection according to claim 7, wherein the sending the first credential information and the network identifier to the second terminal comprises:

sending the first credential information and the network identifier to the second terminal by adopting a technology of point-to-point wireless communication without networking.

9. The credential information processing method for network connection according to claim 7, further comprising:

storing the second credential information directly from a system memory of the first terminal to a secure storage area of the first terminal; and connecting to the wireless network by using the second credential information stored in the secure storage area.

10. The credential information processing method for network connection according to claim 9, wherein the second credential information comprises certificate data, and the method further comprises:

naming certificate data based on a certificate identifier set for the certificate data before the second credential information is stored directly from the system memory of the first terminal to the secure storage area of the first terminal, and directly storing the named certificate data from the system memory of the first terminal to the secure storage area of the first terminal.

11. The credential information processing method for network connection according to claim 10, wherein the naming certificate data comprises: naming each piece of data comprised in the certificate data by using the certificate identifier, wherein the data comprised in the certificate data has a same certificate identifier; and the data comprises user certificate data, issuer certificate data and a user private key.

12. The credential information processing method for network connection according to claim 10, wherein the connecting to the wireless network by using the second credential information stored in the secure storage area comprises:

in response to an automatic connection instruction, searching the secure storage area for the certificate data for connecting to the wireless network, and connecting to the wireless network by using the found certificate data; or in response to a manual connection instruction, enumerating the certificate identifiers of all certificate data in the secure storage area, reading corresponding certificate data based on a manually selected certificate identifier, and connecting to the wireless network by using the read certificate data.

13. The credential information processing method for network connection according to claim 12, wherein in a case that the certificate data is WAPI certificate data, the searching the secure storage area for the certificate data for connecting to the wireless network, in response to an automatic connection instruction comprises:

reading WAPI certificate data in the secure storage area;

associating with a wireless access point AP, receiving an authentication activation packet sent by the wireless access point AP, and obtaining an identity field of a local authentication service unit ASU in the authentication activation packet;

obtaining identity information of the WAPI certificate data by traversing the read WAPI certificate data; and determining that the WAPI certificate data having the identity information is the certificate data for connecting to the wireless network in a case that the identity information is determined to match the identity field of the local authentication service unit ASU.

14. The credential information processing method for network connection according to claim 12, wherein a network configuration interface is obtained by modifying a WifiConfiguration class of the Android system; the modified WifiConfiguration class comprises:

a member variable describing a key type of a pre-shared key, a member variable describing contents of the pre-shared key, a member variable describing a certificate selection mode, and a member variable describing a certificate identifier of a certificate selected in a manual mode.

15. The credential information processing method for network connection according to claim 14, wherein in a case that the certificate data is WAPI certificate data, a network configuration interface is obtained by further modifying a KeyMgmt subclass of the WifiConfiguration class; and the modified KeyMgmt subclass comprises: a definition of a WAPI pre-shared key type and a definition of a WAPI certificate type.

16. A credential information processing method for network connection, applied in a second terminal, comprising:

receiving first credential information and a network identifier of a wireless network to be connected sent by a first terminal, wherein the first credential information is downloaded from a server and sent to the second terminal by the first terminal, in response to an instruction to apply a networking credential for the second terminal, wherein no processing is performed on the first credential information before the first credential information is sent to the second terminal;

directly storing the first credential information from a system memory of the second terminal to a secure storage area of the second terminal; and connecting to the wireless network having the network identifier by using the first credential information in the secure storage area.

17. The credential information processing apparatus for network connection according to claim 16, wherein the receiving first credential information and a network identifier of a wireless network to be connected sent by a first terminal comprises: receiving the first credential information and the network identifier sent by the first terminal by adopting a technology of point-to-point wireless communication without networking.

18. The credential information processing method for network connection according to claim 16, wherein the first credential information comprises certificate data, and the method further comprises:

naming certificate data based on a certificate identifier set for the certificate data before the first credential information is directly stored from the system memory of the second terminal to the secure storage area of the second terminal, and directly storing the named certificate data from the system memory of the second terminal to the secure storage area of the second terminal.

19. The credential information processing method for network connection according to claim 18, wherein the naming certificate data comprises: naming each piece of the data comprised in the certificate data by using the certificate identifier, wherein the data comprised in the certificate data has a same certificate identifier; and the data comprises user certificate data, issuer certificate data and a user private key.

20. The credential information processing method for network connection according to claim 19, wherein the connecting to the wireless network having the network identifier by using the first credential information in the secure storage area comprises:

in response to an automatic connection instruction, searching the secure storage area for the certificate data for connecting to the wireless network, and connecting to the wireless network by using the found certificate data; or in response to a manual connection instruction, enumerating certificate identifiers of all certificate data in the secure storage area, reading corresponding certificate data based on a manually selected certificate identifier, and connecting to the wireless network by using the read certificate data.

21. The credential information processing method for network connection according to claim 20, wherein in a case that the certificate data is WAPI certificate data, the searching the secure storage area for the certificate data for connecting to the wireless network, in response to an automatic connection instruction comprises:

reading WAPI certificate data in the secure storage area;

associating with a wireless access point AP, receiving an authentication activation packet sent by the wireless access point AP, and obtaining an identity field of a local authentication service unit ASU in the authentication activation packet;

obtaining identity information of the WAPI certificate data by traversing the read WAPI certificate data; and determining that the WAPI certificate data having the identity information is the certificate data for connecting the wireless network in a case that the identity information is determined to match the identity field of the local authentication service unit ASU.

22. The credential information processing method for network connection according to claim 20, wherein a network configuration interface is obtained by modifying a WifiConfiguration class of the Android system; the modified WifiConfiguration class comprises:

a member variable describing a key type of a pre-shared key, a member variable describing contents of the pre-shared key, a member variable describing a certificate selection mode, and a member variable describing a certificate identifier of a certificate selected in a manual mode.

23. The credential information processing method for network connection according to claim 22, wherein in a case that the certificate data is WAPI certificate data, a network configuration interface is obtained by further modifying a KeyMgmt subclass of the WifiConfiguration class; and the modified KeyMgmt subclass comprises: a definition of a WAPI pre-shared key type and a definition of a WAPI certificate type.

24. A storage medium storing a computer readable instruction, wherein the instruction, when being executed by a computer, causes the computer to perform operations of:

sending a first credential download request to a server in response to an instruction to apply a networking credential for a second terminal; receiving first credential information sent by the server in a case that user identity verification is successful; and directly sending the first credential information and a network identifier of a wireless network to be connected, to the second terminal from a system memory of the first terminal, wherein no processing is performed on the first credential information before the first credential information is sent to the second terminal;

wherein the first credential download request carries user identity information of the first terminal, and the user identity information is used by the server to perform user identity verification on the first terminal; the first credential information is stored in a secure storage area of the second terminal and is used by the second terminal to connect to the wireless network having the network identifier.

25. The storage medium according to claim 24, wherein the instruction causes the computer to further perform operations of:
  directly storing the second credential information to a secure storage area of the first terminal from a system memory of the first terminal; and
  connecting to the wireless network by using the second credential information stored in the secure storage area.

26. The storage medium according to claim 25, wherein the second credential information comprises certificate data; before the second credential information is directly stored from the system memory of the first terminal to the secure storage area of the first terminal, the instruction causes the computer perform an operation of naming the certificate data based on a certificate identifier set for the certificate data, wherein the named certificate data is directly stored to the secure storage area of the first terminal from the system memory of the first terminal.

27. The storage medium according to claim 26, wherein the instruction causes the computer to further perform operations of:
  performing a network connection operation in response to an automatic connection instruction, wherein the secure storage area is searched for the certificate data for connecting to the wireless network, and the wireless network is connected to by using the found certificate data; or
  performing a network connection operation in response to a manual connection instruction, wherein certificate identifiers of all certificate data in the secure storage area are enumerated, corresponding certificate data is read based on a manually selected certificate identifier, and the wireless network is connected to by using the read certificate data.

28. A storage medium storing a computer readable instruction, wherein the instruction, when being executed by a computer, causes the computer to perform operations of:
  receiving first credential information and a network identifier of a wireless network to be connected sent by a first terminal, wherein the first credential information is downloaded from a server and sent to the second terminal by the first terminal, in response to an instruction to apply a networking credential for the second terminal, wherein no processing is performed on the first credential information before the first credential information is sent to the second terminal;
  calling a storage module of the second terminal to store the first credential information directly to a secure storage area of the second terminal from the system memory of the second terminal; and
  calling a network connection module of the second terminal to connect to the wireless network having the network identifier by using the first credential information stored in the secure storage area.

29. The storage medium according to claim 28, wherein the first credential information comprises certificate data; before the first credential information is directly stored to the secure storage area of the second terminal from the system memory of the second terminal, the instruction causes the computer to perform an operation of naming certificate data based on a certificate identifier set for the certificate data, wherein the named certificate data is directly stored to the secure storage area of the second terminal from the system memory of the second terminal.

30. The storage medium according to claim 29, wherein the instruction causes the computer to further perform operations of:
  performing a network connection operation in response to an automatic connection instruction, wherein the secure storage area is searched for the certificate data for connecting to the wireless network, and the wireless network is connected to by using the found certificate data; or
  performing a network connection operation in response to a manual connection instruction, wherein certificate identifiers of all certificate data in the secure storage area are enumerated, corresponding certificate data is read based on a manually selected certificate identifier, and the wireless network is connected to by using the read certificate data.

* * * * *